H. RITCHEY.
MILK PAIL.
APPLICATION FILED OCT. 17, 1914.
1,207,625.
Patented Dec. 5, 1916.
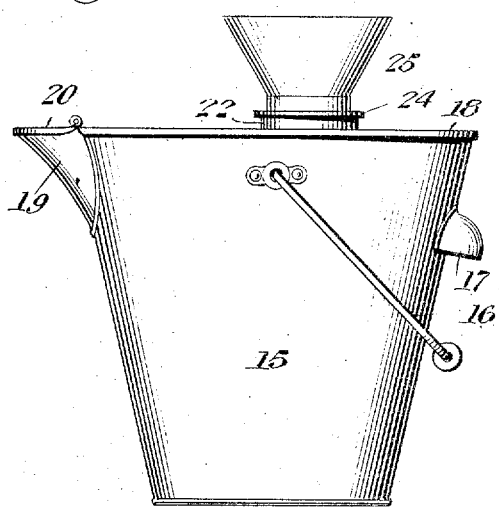
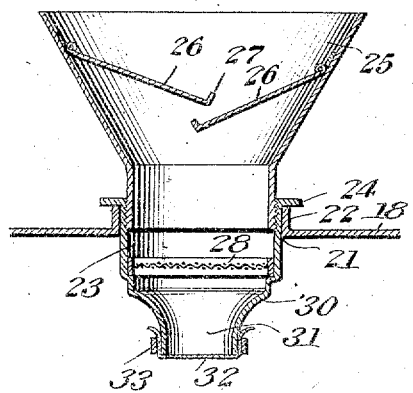
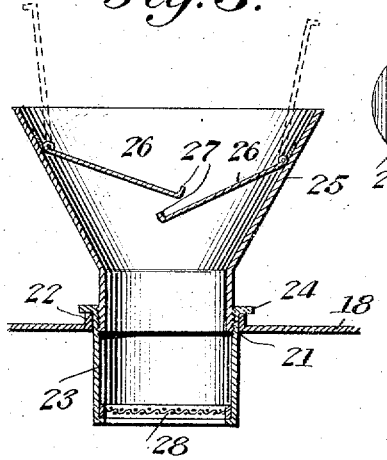
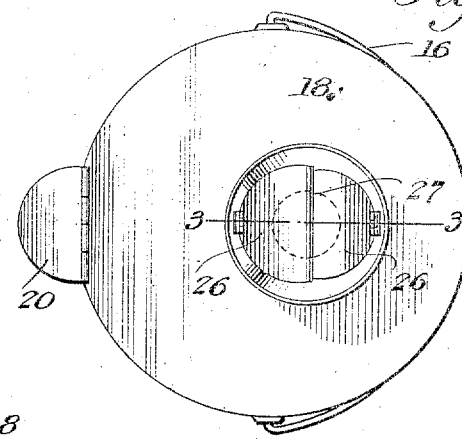
Inventor
Harry Ritchey
By Victor J. Evans
Attorney
Witnesses

UNITED STATES PATENT OFFICE.

HARRY RITCHEY, OF DWIGHT, ILLINOIS.

MILK-PAIL.

1,207,625.   Specification of Letters Patent.   Patented Dec. 5, 1916.

Application filed October 17, 1914. Serial No. 867,152.

*To all whom it may concern:*

Be it known that I, HARRY RITCHEY, a citizen of the United States, residing at Dwight, in the county of Livingston and State of Illinois, have invented new and useful Improvements in Milk-Pails, of which the following is a specification.

This invention relates to strainer attachments for milk pails, and it has for its object to produce a device of this class which will be simple in construction and effective in operation.

A particular object of the invention is to produce a strainer having an inlet funnel in threaded connection therewith so that while said strainer and funnel are separately connected they will not be liable to become accidentally disconnected; said strainer consisting of an exteriorly smooth tubular member which may be readily inserted through an opening in the top of a milk pail and which is provided at its upper edge with a stop flange to support it in desired position.

A further object of the invention is to so construct the inlet funnel that dirt and impurities shall be excluded while the admission of the milk is not interfered with or prevented.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a side elevation of a milk pail constructed in accordance with the invention. Fig. 2 is a top plan view. Fig. 3 is a sectional detail view on a larger scale taken on the line 3—3 in Fig. 2. Fig. 4 is a sectional detail view showing a modification.

Corresponding parts in the several figures are denoted by like characters of reference.

The pail 15 is provided with a bail 16, whereby it may be carried, and it has a handle 17 whereby it may be conveniently tipped or tilted. The pail has a stationary lid 18 and a pouring spout 19 for which a hinged lid or cover 20 is provided so that the contents of the pail may be readily poured out by tilting the same.

The stationary top portion 18 of the pail has an opening 21 surrounded by an annular flange 22 for the passage of a strainer tube 23 which is provided at its upper edge with an annular flange 24 resting or abutting on the flange 22 with which the strainer tube is slidably connected, as shown. The upper end of the strainer tube is internally threaded for the reception of the inlet funnel 25 which is provided with hinged baffles 26 having upturned flanges 27. These baffles, while not interfering with the admission of milk, will exclude impurities and will also obstruct the entrance of flies and other noxious insects. It is also obvious that the baffles being hingedly connected with the inlet funnel may be readily moved to a non-obstructing position, as indicated in dotted lines in Fig. 3, thereby affording convenient access to the interior of the funnel to permit the latter to be thoroughly cleansed. Secured in the strainer tube 23 near the lower end thereof is a wire strainer 28.

It will be readily seen that the milk admitted into the pail through the funnel 25 will be strained and will be kept from any possible admixture with impurities of any kind. With strainers having unprotected inlet funnels it frequently happens that flies and other insects gain admission to the strainer where they are caught on the sieve bottom thereof so that milk subsequently entering through the funnel will necessarily become contaminated by the bodies of such insects. By protecting the inlet funnel with the baffle members as herein shown dirt and insects will be effectively excluded, and the milk will be admitted to the pail in a pure and uncontaminated condition. By tipping or tilting the pail, the contents may be discharged over the spout 19.

In Fig. 4 of the drawing has been shown a modification which consists in tapering the lower end of the strainer tube so as to reduce the diameter thereof, as shown at 30, the reduced lower portion 31 being, however, cylindrical in shape, so that an auxiliary strainer 32 preferably consisting of a piece of textile material, may be mounted thereon by means of a resilient band or hoop 33. The milk will thus be more thoroughly strained, any fine impurities being retained in the textile strainer or filter 32, which latter may be readily washed and scalded and replaced for further use. All the parts of the device are separable, thus enabling each part to be readily washed and sterilized and thus kept in a perfectly sanitary condition.

It will be understood that the improved device is not merely a container, but that it serves as a milking pail into which the milk is drawn direct from the cow, the milk being practically strained as it enters into the body of the container. The pail will be made of ample size to contain the milk from several cows, and it may be readily carried from one animal to another, its size being such as to prevent splashing and liability of upsetting. The straining device consists of the detachable funnel, the parts of which are readily accessible for cleaning purposes, especially in view of the fact that the baffles or deflectors 26 are hingedly supported so that they may be readily moved to the position shown in dotted lines in Fig. 3, thus enabling the interior of the funnel or strainer to be reached.

Having thus described the invention, what is claimed as new, is:—

1. A straining device adapted for detachable connection with a milk pail, said straining device comprising a tubular member carrying a straining element, and an inlet funnel, the latter being in threaded engagement with the tubular member, said inlet funnel being provided with overlapping baffle members having upstanding flanges.

2. A straining device adapted for detachable connection with a milk pail, said straining device comprising a tubular member carrying a straining element, and an inlet funnel, the latter being in threaded engagement with the tubular member, said inlet funnel having baffle members hingedly supported therein and adapted to be raised to a non-obstructing position.

In testimony whereof I affix my signature in presence of two witnesses.

HARRY RITCHEY.

Witnesses:
SIDNEY BROWNSEY
HENRY GANZERT.